United States Patent Office 2,730,050
Patented Jan. 10, 1956

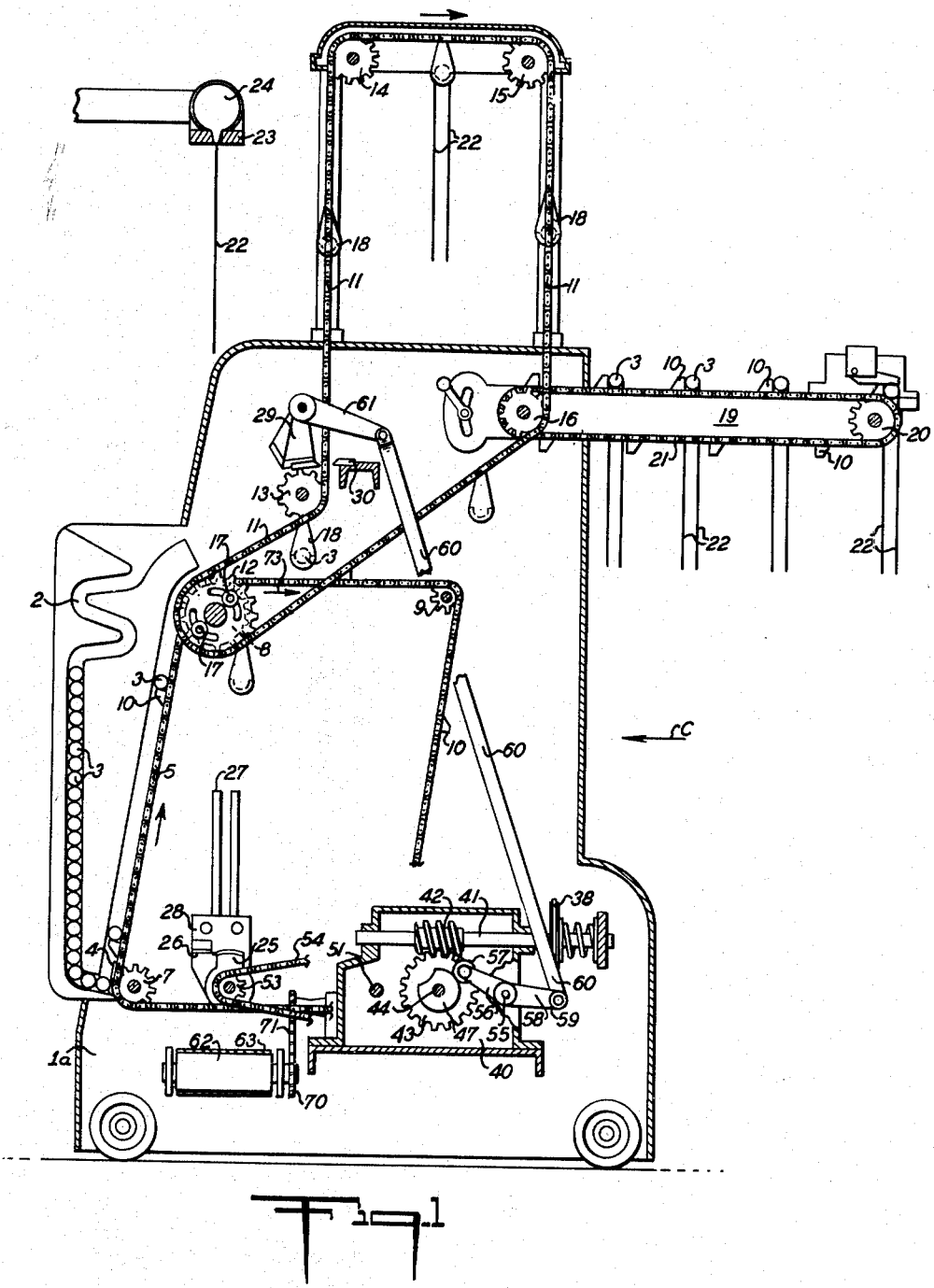

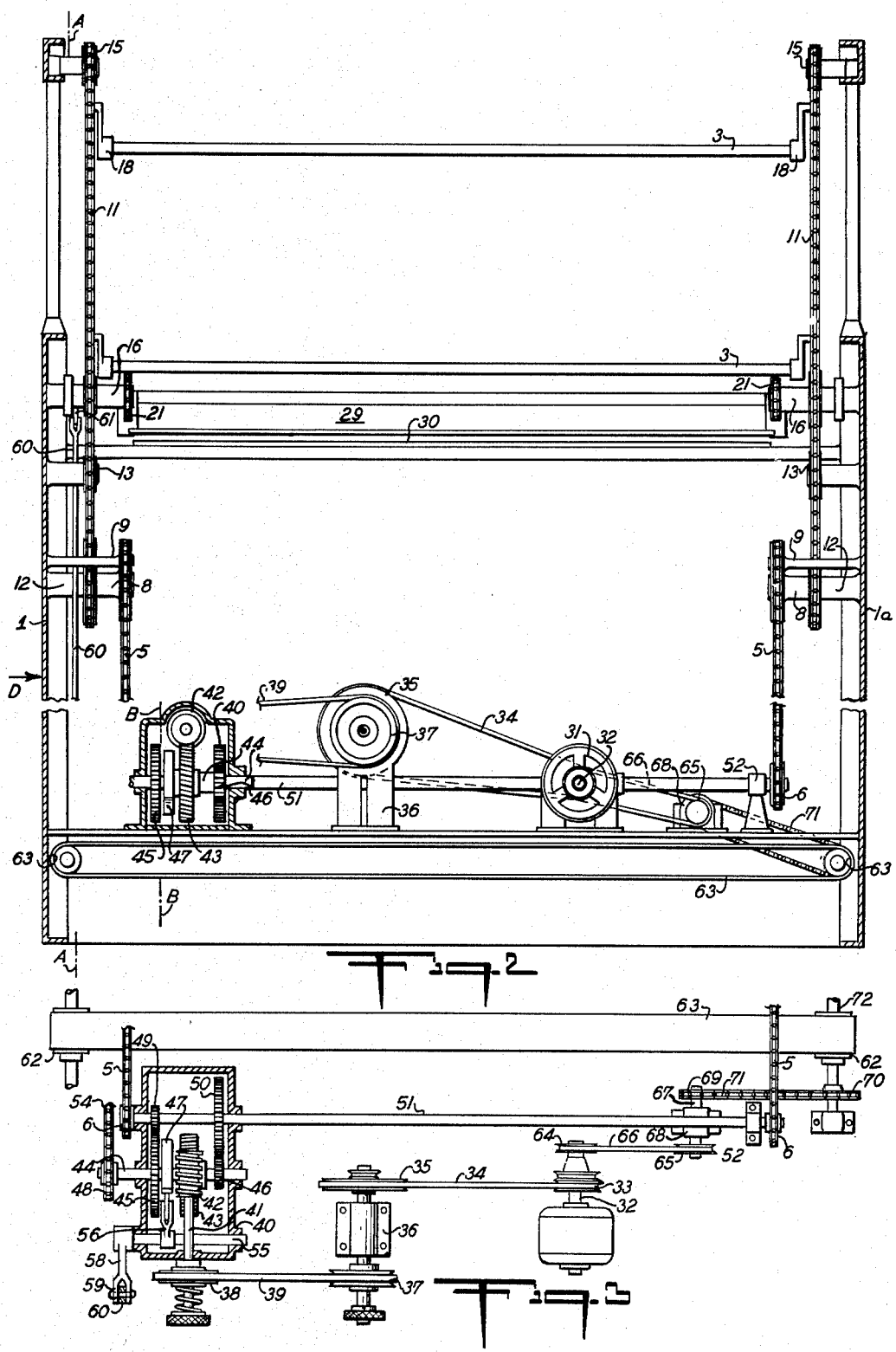

2,730,050

CUTTING AND REMOVING DEVICE FOR BUNCHES OF DOUGH STRINGS

Mario Braibanti and Giuseppe Braibanti, Milan, Italy

Application November 4, 1952, Serial No. 318,682

Claims priority, application Italy October 7, 1948

2 Claims. (Cl. 107—7)

The invention relates to a cutting and removing device for bunches of dough strings which issue from rows of nozzles in curtain form, with the employment of shears and carrying rods for the dough strings, which rods are conveyed, spaced from one another, into the discharge path of the dough strings.

This application is a continuation-in-part of patent application Serial No. 74,633, filed February 4, 1949, now abandoned.

In order to prevent, with great certainty, the removed and cut-off dough strings from hanging unsymmetrically with ends of different lengths on the carrying rods and, further, notwithstanding the fluctuations in the speed of discharge of the dough strings, to secure that, over the whole length of the carrying rods, the lengths of the dough strings should all be the same after the end of the cutting operation, thus providing the most favorable preliminary conditions for the further treatment, use should, according to the invention, be made of the above mentioned operating means in the arrangement, construction and method of movement hereinafter set forth.

In the first place, there are provided two shears with horizontal cutting planes, but on different levels, of which the lower shear is to be arranged vertically beneath the rows of nozzles and the upper shear should be arranged parallel to and laterally displaced in relation to the former shear, the former shear operating in rapid cutting sequence, while the upper shear operates with longer time intervals between cuts to be hereinafter more fully explained. It is also important that the difference in level between the two shears should be greater than the desired stretched total length, to be cut off, of each string of dough.

In addition, for the purpose of solving the problem mentioned, there is required an endless carrying-rod conveying device which is moved transversely of the discharge plane of the dough strings, preferably horizontally, and the section line of which must, with the discharge plane of the dough strings, lie above the lower shear at about half the desired length of the bundle of dough threads to be cut off, it being necessary for the catches for the carrying rods, which catches are present in the conveying device, to be at such distances from one another and for their speed of movement to be so attuned to the speed of discharge of the dough strings that, between two successive entries of the rods into the discharge plane of the dough strings, it is possible for at least the desired cut-off length of the dough strings to be discharged from the nozzles with certainty.

Furthermore, a second endless conveying device, which removes the carrying rods from the first conveying device, has a vertical rod-conveying path which passes through the cutting range of the upper shear, is necessary, it being necessary for the speed of this second conveying device to be such that, in the interval of time from the taking over of the rods up to the cutting by the upper shear, it traverses a distance which has to correspond to about the total of the difference in level between the horizontal conveying distance of the first conveying device and the upper shear plus half the desired cut-off length of the dough strings. Naturally, with the same speeds of the two successively arranged carrying-rod conveying devices, this object can be achieved by adjusting the differences of level of the individual devices to the requirements described.

Finally, an operating device for performing the cutting movement of the otherwise open top pair of shears must be provided. This operating device may consist of, for example, a continuously rotating cam which, at a suitable instant, operates a lever mechanism by means of which the cutting is effected.

It is only all the above parts of the device taken together in the described arrangement and method of movement which give the desired uniform cut product.

In order, notwithstanding fluctuations in the discharge speed of the dough strings, always to obtain equal cut lengths of dough threads or to be able to effect an alteration of the cut lengths, the lower shear is arranged in the machine so as to be displaceable in its vertical position on the one hand, and, on the other hand, the said cam can be exchanged for effecting the cutting by the upper shear.

An example of embodiment of the invention is represented in the accompanying drawings, of which:

Fig. 1 is a side elevation in direction D of Fig. 2 of the machine with removed side wall along the line A—A of Fig. 2 and the controlling gearing in section along the line B—B of Fig. 2;

Fig. 2 is a front elevation of the machine in direction of the arrow C of Fig. 1; and Fig. 3 is a plan of the driving mechanism which is partly represented in section.

Referring to the drawings, especially to Figs. 1 and 2, two side walls forming the frame of the machine are denoted by 1 and 1a. As can be seen from Fig. 2, different elements of the machine are similarly arranged on the two side walls.

Thus, there is provided on the front part of the walls 1 and 1a a magazine 2 for the dough-string carrying rods 3, which is formed by recesses in the side walls 1 and 1a, which recesses are partially serpentine and widen in funnel fashion at the top (Fig. 1). The empty rods 3, which are inserted in the top of the magazine 2, arrive, owing to their own weight, at the lower discharge opening 4, moving past which is the conveying device represented by the endless chains 5. The chains 5 are trained over the pinions 6, 7, 8 and 9, pinions 7, 8 and 9 being rotatable on the side walls 1 and 1a, and are operated by means of the pinions 6 in the manner hereinafter described. The chains 5 are provided, at certain distances from one another, with catches 10 which are adapted to take a carrying rod 3 from the magazine 2 at its discharge opening 4, by grasping the rod at its two ends, and first conveying it upwards and then horizontally. On the side walls 1 and 1a, there is also provided a second conveying device for the rods 3 which is formed by the endless chains 11 that are trained over the pinions 12, 13, 14, 15 and 16. The chains 11 are driven, by means of the pinions 12 which are arranged on the same axles as the pinions 8 of the chains 5, at the same angular speed as the chains 5 themselves. The relative positions of the pinions 12 and 8 in relation to the axle are adjustable by reason of the fact that one of the pinions can be rotated and the adjustment effected can be fixed by means of the screws 17 passing through concentric slots in pinions 8 and threaded into pinions 12. This expedient serves for synchronising the movements of the two conveying devices.

On the conveying chains 11 there are fitted, at certain distances from one another, swinging carriers 18 which are adapted to lift the carrying rods 3 from the chains 5 by engaging them on both sides and conveying them first upwards, then a certain distance horizontally and finally downwards. Each of the carriers 18 includes an arm swingably mounted at one end on the chain 11 and having a semi-circular socket on the opposite end opening toward the pivoted end or upwardly.

Provided on the arms 19 which can be swung out and which are arranged on the side walls 1 and 1a respectively, is a third conveying device for the carrying rods 3, which consists of the chains 21 which run over the double pinions 16 and the pinions 20 and the function of which is to remove the rods 3, which are already loaded with the dough strings, from the chains 11 and convey them outside the machine.

The dough strings 22 are continuously extruded from the row of nozzles 23 of a long dough-extruding tube 24 which extends, transversely of the machine, approximately from one side wall 1 to the other 1a. Dough is fed under pressure to the tube or manifold 24 from a suitable dough press (not shown) which may take the form of a cylinder containing a supply of dough or alimentary paste and communicating with the tube 24, with a manually or hydraulically operated piston working in the cylinder to press the dough through tube 24 and out of the nozzles 23. Vertically beneath this row of nozzles 23, are a continually rotating cutting element 25 as well as the counter-blade 26, which are mounted on the two sides of a carrier 28 which is displaceable along the guide rails 27. The guide rails 27 are, in turn, arranged vertically on the two side walls 1 and 1a. The cutting element 25 and the counter-blade 26 are located at a certain distance beneath the horizontal conveying plane of the chains 5, which corresponds to approximately half the desired length of the dough strings. A second cutting element 29 with a counter-blade 30, which is displaced laterally of but parallel to the lower cutting element 25, is located above the horizontal conveying plane of the chains 5. This cutting element 29 operates intermittently and its operation will hereinafter be described in greater detail.

All the movable elements of the machine are driven from the motor 31. The movement of rotation of the shaft 32 of the motor is transmitted, by means of the belt pulley 33 and the belt 34, to the pulley 35 of the speed regulator 36 and, from the latter, by means of pulleys 37 and 38 and the belt 39, to the controlling and reduction gearing 40, the pulley 38 being mounted on the shaft 41, the inner end of which is in the form of a worm 42. The worm 42 operates, through the worm wheel 43, the shaft 44 of the intermediate gearing, on which shaft the toothed wheels 45 and 46 as well as the cam 47 and the pinion 48 are also fixed. The toothed wheels 45 and 46 mesh with the toothed wheels 49 and 50, which are mounted on the shaft 51 which projects from the gearing 40 and which is mounted, on the one hand, in the casing of the gearing 40 and, on the other hand, in a bearing bracket 52 and on the two ends of which are fixed the pinions 6 by means of which the chains 5 and, consequently, all the conveying devices (chains 5, 11 and 21) are driven. The lower shear 25 is continually rotated through the pinion 48 mounted on the shaft 44 of the intermediate gearing, by means of the chain 54 that is trained over the pinion 53 on a shaft supporting shear 25, whilst the intermittent cutting movement of the upper shear 29 is controlled by the cam 47. For this purpose, there is provided, in the gearing 40, a lever of the first order which is rotatable about the axle 55 and one arm 56 of which carries a roller 57 which rides on the cam 47, whilst its second arm 58 terminates in a fork 59. Engaging in the said fork 59 is the rod 60 which operates the upper shear 29 through the lever 61 mounted on a shaft carrying this shear.

Beneath the lower shear 25 there is provided a conveyor belt 63 which runs over rollers 62 and which serves for conveying away the scraps of dough that are produced by the shear 25 on the trimming of the ends of the dough strings.

The operation of this conveyor belt is effected directly from the motor 31, the shaft 67 being driven in an intermediate bearing 68 by means of the pulleys 64 and 65 and the belt 66, from which, by means of the pinions 69 and 70 and the chain 71, the shaft 72, on which one of the rollers 62 is mounted, is operated.

The operation of the machine described for cutting and removing bunches of dough strings, which issue in long curtain form from rows of nozzles is, according to the invention, as follows:

From the rows of nozzles 23 of the long dough-extruding tube 24, the dough strings 22 are extruded in the form of a long curtain and finally arrive in the horizontal cutting range of the lower cutting element 25 which is constantly rotated in rapid cutting sequence by the chain 54 from the shaft 44 of the gearing. The level of the shear 25 beneath the horizontal conveying range of the conveying chains 5 for the carrying rods 3 corresponds to half the desired length of cut-off dough strings. The arrangement of the catches 10 for the rods 3 on the chains 5 is such that the shear 25 can produce only a small amount of waste and the rod 3 always arrives in proper time in the discharge range of the dough strings.

The carrying rod 3, which is seized by the conveying chains 5 by means of the catches 10 at the discharge opening 4 of the magazine 2 and is conveyed upwards, and which is followed up in sequence in its travel through the whole machine, now drives, in its horizontal movement, the downwardly hanging ends of all the dough strings 22 to the side in the direction of the arrow 73 (Fig. 1), a further slipping of the dough strings being prevented owing to the fact that the latter, which are still in the damp condition, are deflected from their path at right angles and are thus bent and are laid over the carrying rod. Shortly afterwards, this carrying rod 3 is grasped by the swing carriers 18 of the second conveying device (represented by the chains 11) on both sides and is lifted from the chains 5, to be led vertically upwards through the open gap between the top cutting element 29 and its counter-blade 30. During this lifting movement of the rods 3, the following strings 22 continue to hang on the other side of the rod 3. When the already one-sidedly cut-off ends of the dough strings that are hanging on the rods 3 have reached the horizontal shearing plane of the top shear 29, this shear is automatically caused to cut. This is brought about by the fact that, precisely at this point of time, the cam 47 in the gearing 40 operates the lever arm 56 and, consequently, also the lever arm 58 through the axle 55, so that, by means of the connecting rod 60 and the lever 61, the cutting element 29 is moved to close against the counter-blade 30. In this way, the downwardly hanging end of each dough string 22 is also severed and becomes free, so that the dough strings hang down freely on both sides on the carrying rod. After the cutting, the upper shear 29 is again opened by means of the cam 47 and the interposed levers and remains open until the next carrying rod 3 has passed through. The loaded carrying rod 3 is conveyed further by the swinging carriers 18 until it is seized by the chains 21 of the third conveying device and is conveyed outside the machine, where it can, if required, be fed to a further treatment in drying chambers or the like.

What we claim is:

1. In a cutting and removing machine for bunches of dough strings issuing in long curtain form from rows of nozzles of a dough-goods press; the combination of two shears in horizontal cutting planes and at different levels, the lower of said shears being arranged vertically beneath the row of nozzles and the upper shear being laterally displaced in relation to and parallel to the lower shear, said lower shear operating in rapid cutting sequence and said upper shear operating with longer time intervals between successive cutting actions, a first endless conveying device including an endless chain, trained over pinions, at the opposite sides of the machine, said chains being provided, at certain distances apart, with catches for grasping and driving dough carrying rods for the dough strings and driven from one of the said pinions, a magazine for dough carrying rods, the carrying rods being taken singly from said magazine and conveyed by said first conveying device into a plane transverse to the discharge plane of the dough strings, a second endless conveying device including an endless chain, trained over pinions, at the opposite sides of the machine, on which chains there are provided, at certain distances apart, swinging carriers which grasp said carrying rods at the opposite ends and lift them from the first conveying device shortly after they have passed the discharge plane of the dough strings said second conveying device conveying the carrying rods vertically upwards through said upper shear while the latter is open, said chains of the second conveying device being trained over driving pinions which are driven by the chains of said first conveying device, a third conveying device including endless chains each of which is trained over a pinion and which run respectively along arms projecting from the machine at the opposite sides of the latter last mentioned chains being provided with catches removing the carrying rods singly from said second conveying device and conveying them outside the machine, a driving motor and a speed regulator as well as controlling gearing driven from said motor for operating the moved parts of the machine, and a controlling mechanism driven from said motor for intermittently operating the said top shears.

2. In a cutting and removing machine for bunches of dough strings issuing in long curtain form from rows of nozzles of a dough-goods press; the combination of two shears in horizontal cutting planes and at different levels, the lower one of the shears being arranged vertically beneath the row of nozzles, the upper shear being laterally displaced in relation to and parallel to the lower shear, the lower shear operating in rapid cutting sequence and the upper shear operating with longer time intervals between successive cutting actions, a first endless conveying device for conveying the carrying rods into a plane transverse to the discharge plane of the dough strings, a second conveying device for lifting the carrying rods from said first conveying device after deposit thereon of dough strings and a third conveying device receiving the carrying rods from said second conveying device and conveying the carrying rods, fully loaded with dough strings, out of the machine, a driving motor, a speed regulator, a belt and pulley transmission from said motor to said regulator to drive the latter, a controlling gearing, a belt and pulley transmission from said speed regulator to said gearing to drive the latter, said gearing including an intermediate gearing shaft driven by a worm and worm wheel arrangement, a toothed-wheel transmission from said intermediate gearing shaft to said first conveying device, a pinion and chain transmission from said intermediate gearing shaft to said lower shear for continuously operating the latter, a cam on said intermediate gearing shaft, and rod and lever means actuated by said cam and operating said upper shear, said cam being formed so that said upper shear operates only when said second conveying device has lifted a carrying rod through the open upper shear to a position in which the free ends of the dough strings hanging from the lifted rod depend to the cutting plane of said upper shear, said speed regulator and toothed-wheel transmission being arranged so that the carrying rods are conveyed at a speed which is attuned to the discharge speed of the dough strings to cause discharge of at least the desired cut-off length of the dough-strings from the nozzles between two consecutive entries of carrying rods into the discharge plane of the nozzles.

References Cited in the file of this patent

UNITED STATES PATENTS

| | | |
|---|---|---|
| 1,627,297 | Surico | May 3, 1927 |
| 1,801,967 | Merlino | Apr. 21, 1931 |
| 1,967,213 | Beplate | July 14, 1934 |
| 2,208,900 | Giezendanner | July 23, 1940 |
| 2,220,438 | Ambrette | Nov. 5, 1940 |
| 2,223,352 | DeFrancisci | Dec. 3, 1940 |
| 2,583,847 | Hummel | Jan. 29, 1952 |